(12) United States Patent
Throckmorton

(10) Patent No.: X9190
(45) Date of Patent: Oct. 22, 1835

(54) PLANING MACHINE

(76) Inventor: Reid R. Throckmorton

Reid R Throckmorton City & State N.Y.
Letters Patent

The Schedule referred to in these Letters Patent and part of the same Containing a description in the words of the said Reid R Throckmorton himself of his improvement in the machine for planing Boards and other materials —

To all to whom these presents shall come. Be it known that I Reid R Throckmorton of the City and state of New-York have invented a new and useful improvement in the mode of planing boards and plank and other materials by machinery and that the following is a full and exact description thereof.

In the first place the improvement consists of a frame of wood or iron of about fourteen feet in length and about three feet in breadth standing on six legs about three feet high; said frame to have about four or six cross pieces or girths [illegible] otherwise sufficiently braced to make it firm and strong.

2d Across the frame are placed two or more rollers of about five inches diameter of hard wood or iron turned true two or more beneath and the same above the plane. The under rollers having pullies of about sixteen inches diameter or cog wheels attached to the one end are revolved by means of belts or intermediate cog wheels from a small pulley about six inches diameter or cog wheel on feed shaft underneath the frame. The upper rollers are held down by weights and levers and the gudgeons of which revolve in moveable boxes so as to admit of different thickness of boards or plank said frame has in the Centre immediately underneath the plane a bed plate of iron or Rollers to support the plank during the operation of the plane On the feed shaft there is a drum or Ratchet wheel with its motor (of a drum of about fifteen inches diameter of a ratchet wheel about [illegible] feet diameter) the drum to receive a belt from the first mover a drum of about twenty inches diameter placed beneath
the frame and on the shaft on which said drum is fixed there is
a pully of about twelve inches diameter. The mover to the ratchet
wheel can be attached to the crank shaft or to the plane strap which
ever way may be most Convenient to give the forward and back
=ward motion
The improvement in the plane of this machine consists in pla
=cing upon the bed plate or sides of the frame six small pillars
or studs upon which are placed the guides or a parallel motion
Upon these slides or parallel motion is fixed a cross head with
Gibs or Boxes to slide on the guides so as to cause the cross head to
move in a straight line.
The plane is attached to this cross head by mean
of a strap and permitted partly to revolve (if desired) the strap on said
cross head to be attached thereto behind the cutters or irons of the plane
and is then continued out in length sufficient to reach a crank
which is fixed on an axle on one end of the machine said strap, pit
-man or shackle bar as it is variously denominated serves as a
handle to the plane. The part of the plane on which the knives or
Cutters are fixed is circular as much so as the Circle of the crank will allow
the handle connecting the plane to the crank may be straight or
otherwise as convenience may require The plane should be made
of sufficient length to receive about six Cutters or knives. The crank
should be about six Inches which will move the plane in a rectilineal
course twelve inches at each revolution of said crank and at the same
time by the rise and fall of the plane handle give a circular motion to
the cutters during the reciprocating motion of the plane that is to
say the forward motion of the crank urging the plane ahead, the
knives being on a periphery of a Circle rise out of the wood each as their
individual cut is finished and so on untill all of the knives have
performed their separate parts and at which time they are all
raised off the wood and carried back by said crank and by the
next half revolution of said crank said plane renews its cut and it on alternately, without the aid of any thing else except the simple plane handle and the body of the plane being attached to the cross head and permitted partly to revolve in it.

The side cutters for tongueing and grooving may be arranged upon similar principles as the aforesaid described plane except that the crank shaft should be perpendicular instead of horizontal. The motion may be given by rack and pinion, by sun and planet wheel, by eccentrics and in various other ways, but the crank is the simplest and best. What the undersigned claims in the above described machine is simply the peculiar construction of the plane & side cutters moved by slides or guides and cranks and, resulting in a compound motion reciprocating, rectilineal, and in part circular in one operation by connecting the end of the plane by means of its handle to a crank or any other circular motion In testimony whereof I have hereunto subscribed my name A.D. 1835

Witnesses
W. H. Van Dalsom
John I Van Dalsom

Reid R. M^c Throckmorton—

[illegible]

9.30 [illegible]